(12) United States Patent
Chen et al.

(10) Patent No.: US 7,340,279 B2
(45) Date of Patent: Mar. 4, 2008

(54) WIRELESS COMMUNICATIONS WITH AN ADAPTIVE ANTENNA ARRAY

(75) Inventors: Tao Chen, San Diego, CA (US); Harris Simon, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 830 days.

(21) Appl. No.: 09/816,559

(22) Filed: Mar. 23, 2001

(65) Prior Publication Data

US 2002/0137538 A1 Sep. 26, 2002

(51) Int. Cl.
*H04M 1/00* (2006.01)

(52) U.S. Cl. .......... 455/562.1; 455/69; 455/432.1; 370/334; 370/328; 342/158

(58) Field of Classification Search ........ 455/562.1, 455/561, 69, 424, 67.16, 456.5, 273, 276.1, 455/432.1; 342/383, 378, 368, 158; 370/335, 370/342, 310, 312, 334, 328
See application file for complete search history.

(56) References Cited

U.S. PATENT DOCUMENTS

| | | | |
|---|---|---|---|
| 3,766,559 A | | 10/1973 | Butcher, Jr. et al. |
| 5,130,715 A | * | 7/1992 | Yanagisawa .......... 342/158 |
| 5,615,409 A | * | 3/1997 | Forssen et al. .......... 455/440 |
| 5,838,674 A | * | 11/1998 | Forssen et al. .......... 370/337 |
| 6,023,607 A | * | 2/2000 | Siira .......... 455/25 |
| 6,104,930 A | * | 8/2000 | Ward et al. .......... 455/450 |
| 6,167,286 A | * | 12/2000 | Ward et al. .......... 455/562.1 |
| 6,249,251 B1 | * | 6/2001 | Chang et al. .......... 342/378 |
| 6,348,986 B1 | * | 2/2002 | Doucet et al. .......... 398/128 |
| 6,349,217 B1 | * | 2/2002 | Honcharenko et al. .. 455/562.1 |
| 6,370,377 B1 | * | 4/2002 | Take et al. .......... 455/432.1 |
| 6,370,397 B1 | * | 4/2002 | Popovic et al. .......... 455/561 |
| 6,385,181 B1 | * | 5/2002 | Tsutsui et al. .......... 370/335 |
| 6,466,166 B2 | * | 10/2002 | Nakagawa .......... 342/378 |
| 6,512,481 B1 | * | 1/2003 | Velazquez et al. .......... 342/367 |
| 6,522,898 B1 | * | 2/2003 | Kohno et al. .......... 455/562.1 |
| 6,600,776 B1 | * | 7/2003 | Alamouti et al. .......... 375/147 |
| 6,768,913 B1 | * | 7/2004 | Molnar et al. .......... 455/562.1 |
| 2002/0034217 A1 | * | 3/2002 | Zhang .......... 375/147 |

FOREIGN PATENT DOCUMENTS

| | | |
|---|---|---|
| EP | 0952747 A2 | 10/1999 |
| EP | 1056304 A2 | 11/2000 |
| GB | 1577939 | 10/1980 |
| WO | 9509490 | 4/1995 |
| WO | 9814024 | 4/1998 |
| WO | 9926440 | 5/1999 |

* cited by examiner

*Primary Examiner*—Danh C. Le
(74) *Attorney, Agent, or Firm*—Thomas R. Rouse; Kenyon S. Jenckes; Roberta A. Young

(57) ABSTRACT

Systems and techniques for parallel demodulation and searching using an adaptive antenna array with a processor configured to control the adaptive antenna to search for a first signal with the first beam and to receive a second signal for demodulation with a second beam.

16 Claims, 5 Drawing Sheets

WIRELESS COMMUNICATIONS WITH AN ADAPTIVE ANTENNA ARRAY

BACKGROUND

1. Field

The present invention relates generally to communications systems, and more specifically, to antenna beam steering techniques in a wireless communications environment.

2. Background

Mobile radio systems allow users to travel freely within a designated service area and communicate with any wireless telephony device or personal communications systems. One such mobile radio system is a code division multiple access (CDMA) cellular system. The CDMA cellular system is a modulation and multiple access scheme based on spread-spectrum communications. In a CDMA cellular system, a large number of signals share the same frequency spectrum and, as a result, provide an increase in user capacity. This is achieved by transmitting each signal with a different pseudo-random binary sequence that modulates a carrier, and thereby, spreads the spectrum of the signal waveform. The transmitted signals are separated in the receiver by a correlator that uses a corresponding pseudo-random binary sequence to despread the desired signal's spectrum. The undesired signals, whose pseudo-random binary sequence do not match, are not despread in bandwidth and contribute only to noise.

One of the major parameters that determine the capacity of a CDMA cellular system is the ratio of the energy per bit to the noise power spectral density ($E_b/N_o$). Thus, the capacity of the CDMA cellular system can be increased if the noise can be decreased. Since the undesired signals applied to the correlator of the receiver contribute to noise, the capacity of the CDMA cellular system can be improved by effectively blocking the undesired signals by optimizing the beam pattern of the antenna. Besides improving the capacity of the CDMA cellular system, this optimized beam pattern may reduce the transmission power required to overcome noise and interference. This reduced power requirement can reduce the cost and allow lower power units to operate at greater ranges. Preferably, the optimization of beam pattern should not compromise the ability of the CDMA cellular system to process multi-path components or search for new communications channels. Accordingly, there is a need in the art for systems and techniques for controlling a beam pattern of an antenna to effectively block undesired signals while maintaining the ability to process multi-path components and search for new communications channels.

SUMMARY

In one aspect of the present invention, a method of reception includes forming a first beam to cover a region, detecting a signal in the region using the first beam, and forming a second beam to receive the detected signal.

In another aspect of the present invention, a receiver system includes an antenna configured to form first and second beams, and a processor configured to control the antenna to search for a first signal with the first beam and to receive a second signal with the second beam.

In yet another aspect of the present invention, a method of communication includes transmitting a signal from a base station, forming a first beam at a remote station to search for the transmitted signal within a region, detecting the transmitted signal with the first beam in the region, and forming a second beam at the remote station to receive the signal.

In a further aspect of the present invention, a remote station includes a processor configured to control an antenna to search for a first signal with a first beam and to receive a second signal with a second beam.

In yet a further aspect of the present invention, computer readable media embodying a method of reception forms a first beam to cover a region, detects a signal in the region using the first beam, and forms a second beam to receive the detected signal.

In another aspect of the present invention, a receiver system includes means for forming a first beam through an antenna to search for a first signal, and means for forming a second beam through the antenna to receive a second signal.

It is understood that other embodiments of the present invention will become readily apparent to those skilled in the art from the following detailed description, wherein it is shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

In an exemplary embodiment of a wireless communications system, improved user capacity can be achieved by employing beam steering techniques to decrease the mutual interference between multiple users. By way of example, in a CDMA cellular system, a directional antenna can be used to generate a beam pattern linking a base station to a remote station, or subscriber station, while minimizing interference from other remote stations in the same or neighboring cells. The directional antenna can include, by way of example, an antenna array made up of spatially separated individual radiating elements. The individual radiating elements can include dipoles, open-ended waveguides, slots cut in waveguides, or any other type of radiating elements. The shape and direction of the beam pattern is determined by the relative phases and amplitudes of the signals applied to the individual radiating elements. By properly varying the relative phases, the shape of the beam pattern can be formed with multiple beams. With this approach, one or more beams can be used to maintain a communications channel between a base station and a subscriber station while the remaining beams can be used to search for multi-path components and other signals. The beams steering techniques can be employed at the subscriber station and/or the base station. In other terrestrial and satellite radio communications systems, the beam steering techniques described herein can be implemented in a variety of fashions depending on the overall design constraints and other factors. Accordingly, any reference to a CDMA cellular system is intended only to illustrate the inventive aspects of the present invention, with the understanding that such inventive aspects have a wide range of applications.

Figure 1:
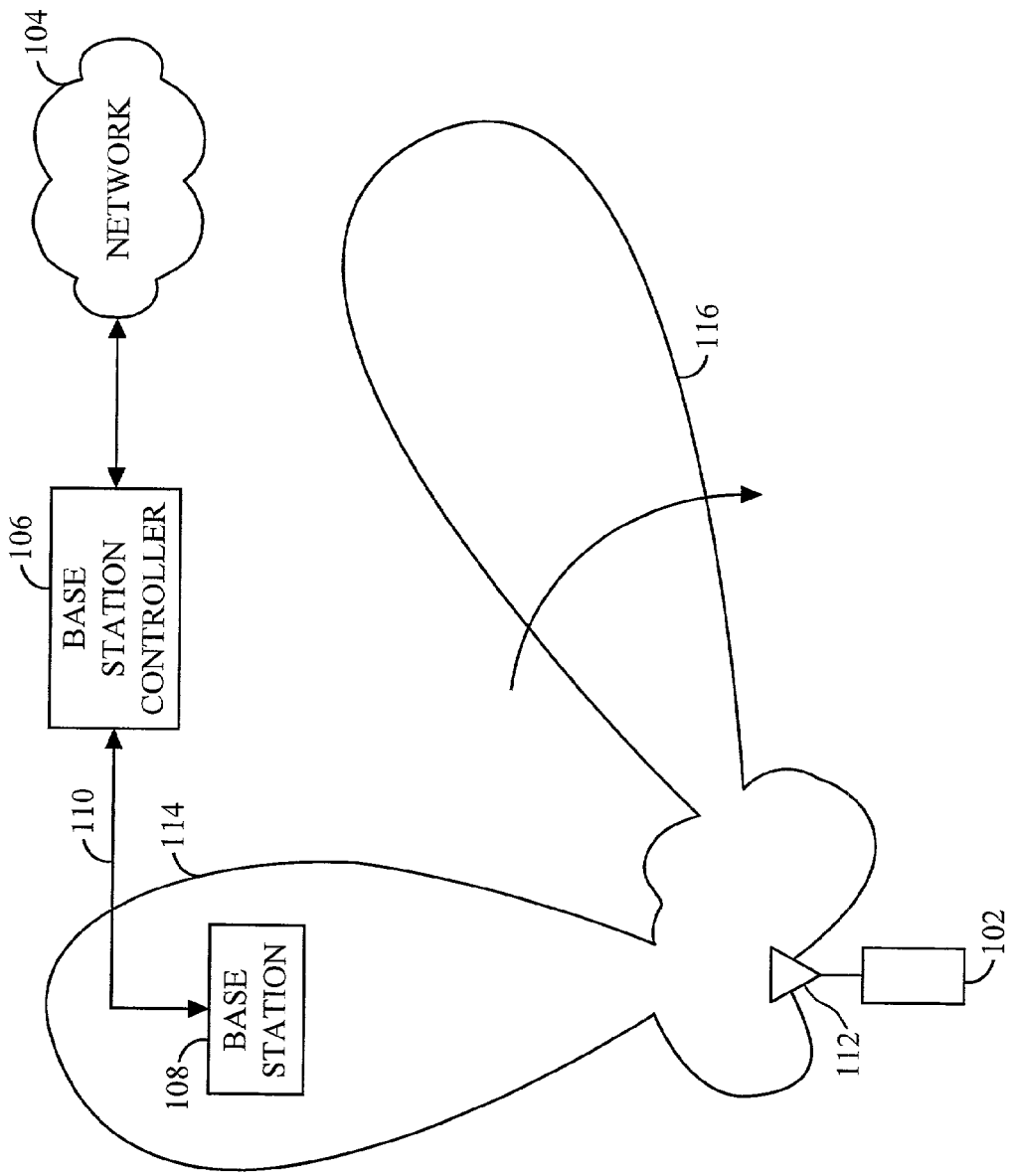
FIG. 1 is a diagram of a CDMA cellular system with beam steering techniques employed by a subscriber station in accordance with an exemplary embodiment.

FIG. 1 is a diagram of an exemplary CDMA cellular system with beam steering techniques employed by a subscriber station. The CDMA cellular system provides a mechanism for a subscriber station 102 to communicate with a network 104. The network 104 is coupled to a base station controller (BSC) 106. The BSC 106 communicates with a base station 108 through a backhaul 110. For ease of explanation, only one base station 108 is shown, however, in practical applications, numerous base stations (not shown) will be coupled to the BSC 106 through separate backhauls (not shown).

The subscriber station 102 includes an antenna array 112 which forms a multiple beam pattern. The subscriber station 102 exchanges signals with the base station 108 located within a tracking beam 114 generated by the subscriber station 102. The tracking beam 114 is used to maintain a communications channel between the subscriber station 102 and the base station 108. A search beam 116 can also formed by the antenna array 112 at the subscriber station which is scanned in azimuth across a geographic region to search for multi-path components of the signal, as well as signals from other base stations (not shown). This approach provides increased gain for receiving signals over a communications channel by the subscriber station without loss of the multi-path components. Furthermore, the subscriber station retains the ability to acquire new signals from other base stations.

Alternatively, the searching function can be performed using an omni-directional beam pattern (not shown). Whether such search function is performed with a search beam, an omni-directional beam pattern, a wide beam, or any other type of beam is a function of the search region, the overall design constraints, the specific application, and the propagation environment in which the exemplary CDMA cellular system is operating. In at least one embodiment, the antenna array can adaptively be switched between a search beam, an omni-directional beam, and a wide beam to best accommodate changing environmental conditions.

Figure 2:
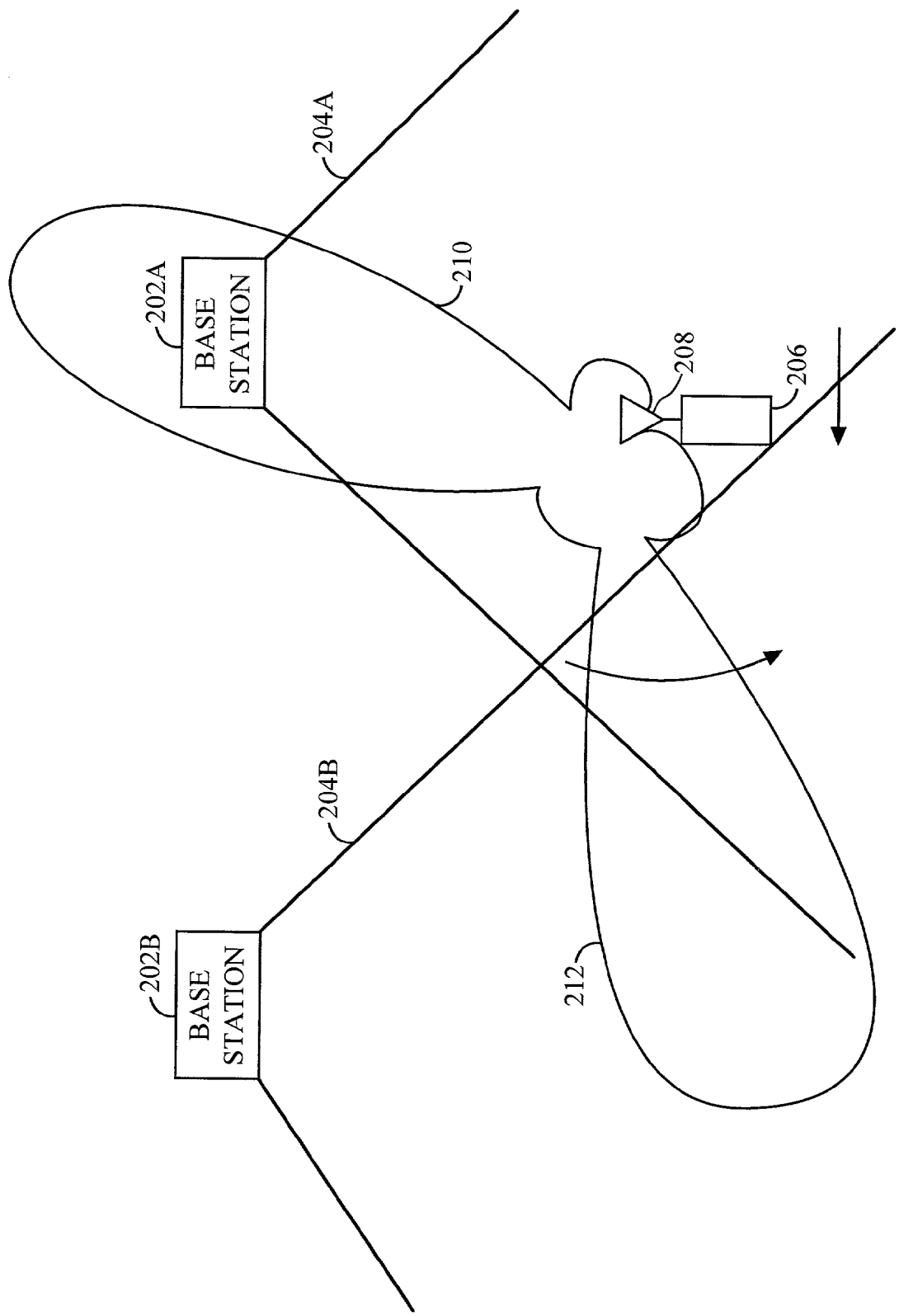
FIG. 2 is a diagram of a CDMA cellular system during soft handoff with beam steering techniques being employed by a subscriber station in accordance with an exemplary embodiment.

FIG. 2 is a diagram of an exemplary CDMA cellular system using beam steering techniques during soft handoff. Soft handoff is the process of establishing a communications channel with a new base station before breaking the existing communications channel with the original base station. Not only does this approach reduce the probability of dropped calls, but it also makes the handoff virtually undetectable by the user. Soft handoffs can be performed based on the strength of the signals received by the subscriber station from multiple base stations. This can be accomplished by measuring at the subscriber station the strength of a pilot signal transmitted from each base station. When the energy level, or power level, of the pilot signal received at the subscriber station from a base station exceeds a threshold, that base station is added to the active set for the subscriber station. The base station is removed from the active set for the subscriber station when the strength of the pilot signal received at the subscriber station from the base station falls below a threshold. In existing CDMA systems, a base station is not removed from the active set of a subscriber station immediately upon the pilot signal strength dropping below the threshold. Rather, the pilot signal strength should remain below the threshold for a predetermined time before the base station is removed from the active set. This approach decreases the likelihood that a base station is removed from a subscriber station's active set because of spurious signal level fluctuations.

As shown in FIG. 2, each base station 202a, 202b transmits and receives signals within its respective cellular sector 204a, 204b. Sectorization of CDMA cells is a technique used to increase user capacity. Cells are typically sectored three ways with one or more base stations utilizing one or more 120° beam width antennas. Because of broad antenna patterns and propagation anomalies, the coverage areas of the sectors overlap considerably. This overlap is used to implement the CDMA-based soft handoff make-before-break switching function between two base stations.

A subscriber station 206 is shown initially moving through the sector 204a. On power-up, the subscriber station 206 controls the relative phases of the signals applied to the radiating elements (not shown) to form either an omni-directional or broad beam pattern that can be swept through the coverage area quickly for acquisition. Once the pilot signal from the base station 202a is detected by the subscriber station 206, the relative phases of the signals applied to the radiating elements (not shown) of an antenna array 208 can be adjusted to form a tracking beam 210 fixed on the base station 202a.

In addition to the tracking beam, the beam pattern formed by the antenna array 208 can include a search beam 212 which is scanned in azimuth across a geographic region in search of multi-path components from the base station 204a, as well as signals from other base stations. Alternatively, the searching function can be performed with an omni-direction beam pattern. The direction of tracking beam 210 can also be changed to optimize performance over the communications channel between the subscriber station 206 and the base station 202a based on the signals received through the search beam or omni-direction beam.

In the event that the subscriber station 206 detects multi-path components from the base station 204a with a pilot signal of sufficient strength, the relative phases of the signals applied to the radiating elements of the of the antenna array 208 can be adjusted to create one or more additional tracking beams (not shown) to increase the gain in the direction of the multi-path components. Alternatively, the shape of the existing tracking beam 210 can be broadened to expand the coverage area to include the communications channel between the subscriber station 206 and the base station 202a as well as multi-path components.

As the subscriber station 206 moves into the soft handoff region where the coverage area of the sectors overlap, the search beam 212 is continuously scanned in azimuth to detect a pilot signal from the base station 202b. Once the pilot signal from the base station 202b is detected, the base station 202b is then added to the active set for the subscriber station 206. As a result, the relative phases of the signals applied to the radiating elements of the antenna array 208 may be adjusted to create a beam pattern with a new tracking beam (not shown) in the direction of the base station 202b while maintaining both the original tracking beam 210 directed toward the base station 202a and the search beam 212 scanned in azimuth. The tracking beam provides increased gain in the direction of the base stations 202a, 202b such that both base stations 202a, 202b can temporarily serve the call during the soft handoff transition.

As the subscriber station 206 moves out of the soft handoff region and into the new sector 204b, the strength of the pilot signal from the original base station 202a decreases until it falls below the threshold causing the subscriber station 206 to remove that base station 202a from its active set. As a result, the relative phases of the signals applied to the radiating elements of the antenna array 208 may again be adjusted to form a beam pattern which eliminates the original tracking beam 210 in the direction of the original base station 202a while maintaining both the new tracking beam (not shown) directed toward the new base station 202b and the search beam 212 scanned in azimuth.

Those skilled in the art will appreciate that a variety of different beam patterns can be formed to accommodate the reception of a signal from an active base station and its multi-path components, as well as signals from other base stations. By way of example, the beam pattern can be formed with one or more tracking beams to exchange signals with an active base station. Similarly, the beam pattern can be formed with one or more tracking beams to receive multi-path components from the active base station or signals from other base stations. The searching function can also be performed using any number of search beams, or alternatively an omni-directional beam. Furthermore, the antenna array can be controlled to sweep the search beam in azimuth or shift rapidly the search beam from one position in space to another position in space in that sector. The shapes of the tracking beams and search beams can be also varied. By way of example, the beam pattern may be adjusted to have wider or narrower tracking beams to accommodate variations in the propagation environment that effect multi-path components. In some instances, side lobes of the beam pattern can be used for receiving a signal from an active base station, receiving its multi-path components, or receiving signals from other base stations.

Figure 3:
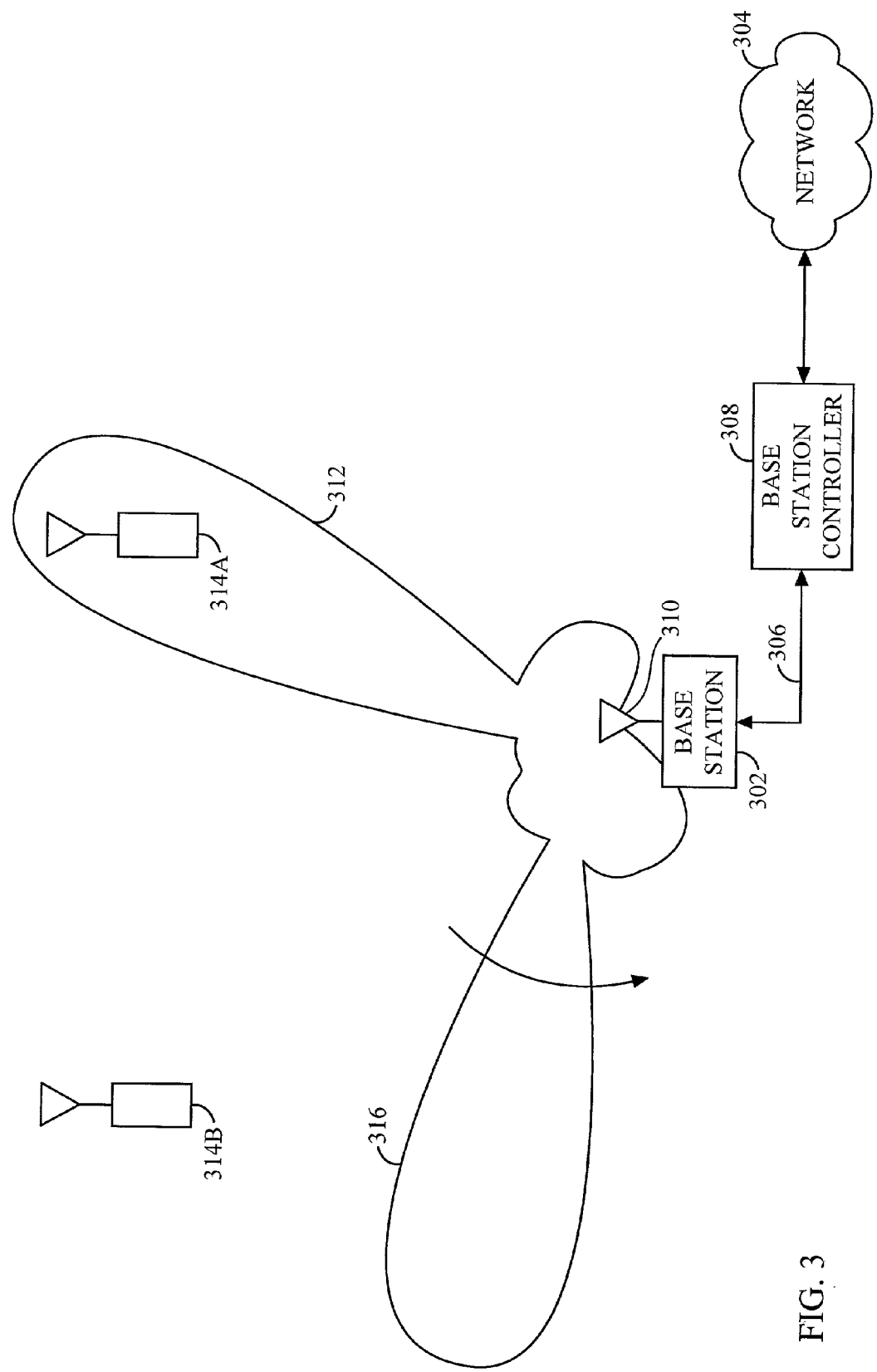
FIG. 3 is a diagram of a CDMA cellular system with beam steering techniques employed by a base station in accordance with an exemplary embodiment.

FIG. 3 is a diagram of an exemplary CDMA cellular system with beam steering techniques employed by a base station. The base station 302 is shown in communication with a network 304 through a backhaul 306 to a BSC 308. The base station 302 includes a directional antenna such as an array antenna 310 made up of spatially separated individual radiating elements. A tracking beam 312 can be formed by the antenna array 310 for maintaining a communications channel with a subscriber station 314a. A search beam 316 can also be formed by the antenna array 310 which is scanned in azimuth across its cellular sector, or any other geographic region, in search of multi-path components of the signal, as well as signals from other subscriber stations. Alternatively, the search beam 316 can be formed using a separate antenna such as mechanically scanned parabolic antenna (not shown) or any other directional antenna known in the art.

The searching function can be alternatively performed by controlling the antenna array 310 to form a 120° wide beam pattern (not shown) superimposed on the tracking beam 312. Whether such search function is performed with a search lobe, a wide beam pattern, or any other beam pattern is a function of the overall design constraints, the specific application, and the propagation environment in which the exemplary CDMA cellular system is operating. In at least one embodiment, the antenna array can adaptively be switched between a search beam and a wide beam pattern to best accommodate changing environmental conditions.

In the described exemplary embodiment, the tracking beam 312 is focused on the subscriber station 314a and the search beam 316 is swept across its cellular sector in search of a subscriber station signal. In the event that the base station 302 detects multi-path components from the subscriber station 314a with a signal of sufficient strength, the relative phases of the signals applied to the radiating elements of the of the antenna array 310 can be adjusted to create one or more additional tracking beams (not shown) to increase the gain in the direction of the multi-path components. Alternatively, the shape of the existing tracking beam 312 can be broadened to expand the coverage area to include the communications channel between the base station 302 and the subscriber station 314a as well as the multi-path components.

As the search beam 316 is further swept across the cellular sector, a subscriber station signal of sufficient strength should be detected by the base station 302 when the search beam 316 is swept across a new subscriber station 314b. The base station 302 is then added to the active set of the new subscriber station 314b. As a result, the relative phases of the signals applied to the radiating elements of the antenna array 310 may be adjusted to create a beam pattern with a new tracking beam (not shown) in the direction of the base station 314b while maintaining both the original tracking beam 312 directed toward the subscriber station 314a and the search beam 316 scanned in azimuth.

As a practical matter, a separate tracking beam for each active subscriber will be a rarity in light of the number of calls that a single base station typically must serve. Instead, a number of tracking beams will generally be employed with each tracking beam servicing all communications channels within an angular region of the cellular sector. By way of example, the width of each tracking beam can be formed to service all active subscriber stations within a 10° angular region. The width of each tracking beam can be adaptively changed to accommodate variations in the number of active subscriber stations and the propagation environment. In addition, the width of each tracking beam can be adaptively changed to minimize mutual interference between the subscriber stations in the cellular sector. For example, a subscriber station requiring a communications channel with a higher data rate will need to transmit at a higher power level to maintain the same $E_b/N_o$ performance. A narrow tracking beam can be used to increase the gain in the direction of that subscriber station to reduce the transmission power needed to support the higher data rate, and thereby reduce the interference to other subscriber stations in the same cellular sector. The same result could be achieved if a narrow tracking beam was focused on subscriber stations located far away from the base station. The transmission power that would otherwise be required by each of those subscriber stations to maintain the same $E_b/N_o$ performance can be reduced by increasing the directional gain of the antenna array at the base station with a narrower tracking beam. For those subscriber stations requiring a communications channel with a reduced data rate or are physically located closer to the subscriber station, a wider tracking beam can be used, or alternatively, a 120° wide beam can be used to service those calls.

Figure 4:
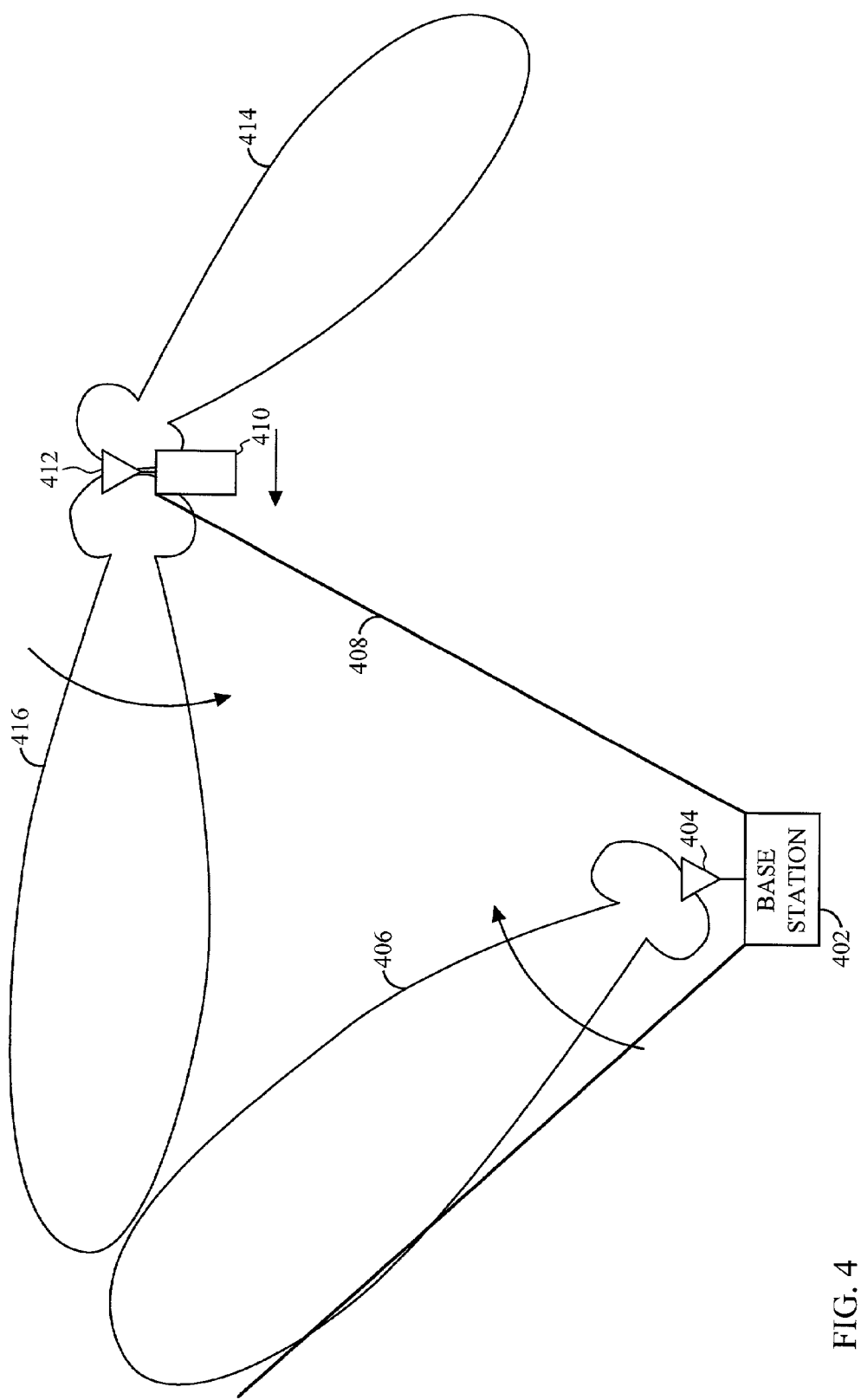
FIG. 4 is a diagram of a CDMA cellular system with beam steering techniques employed by both a base station and a subscriber station in accordance with an exemplary embodiment.

In CDMA cellular systems employing beam steering techniques at both a base station and a subscriber station, the searching function at the subscriber station may be performed using an antenna array that is adaptively switched between a search beam and an omni-directional beam. This concept is illustrated in FIG. 4 where an exemplary CDMA cellular system is shown during soft handoff. In the exemplary CDMA cellular system, a base station 402 includes a directional antenna such as an antenna array 404 made up of spatially separated individual radiating elements. The base station 402 is shown without a communications channel with a subscriber station, and therefore, does not have a tracking beam formed by the antenna array 404. Instead, a search beam 406 is formed by the antenna array 404 and scanned in azimuth across its cellular sector 408 in search of a signal from a subscriber station.

A subscriber station 410 is shown approaching the cellular sector 408 of the base station 402. The subscriber station also includes a directional antenna such as an antenna array 412 made up of spatially separated individual radiating elements. A tracking beam 414 is formed by the antenna array 412 to maintain a communications channel with a base station (not shown) in a neighboring cellular sector during soft handoff. A search beam 416 is also formed by the antenna array 412 at the subscriber station 410 and scanned in azimuth to search for multi-path components from the neighboring base station (not shown).

As the subscriber station 410 moves into the cellular sector 408 of the base station 402, signal acquisition may be difficult due to the asynchronous steering of the search beams between the subscriber station 410 and the base station 402. One exemplary way to facilitate signal acquisition, is to allow the subscriber station 410 and the base station 402 to negotiate the timing of the forward search beam (i.e., the transmission from the base station 402 to the subscriber station 410). This can be achieved by periodically switching the search beam 416 at the subscriber station 410 to an omni-direction beam (not shown). When the omni-directional beam is formed, the subscriber station 410 can monitor the pilot signal strength from the base station 402 from all directions. As the search beam 406 from the base station 402 sweeps through its cellular sector 408, the subscriber station 410 should detect maximum signal strength when the search beam 406 from the base station 402 is focused on the subscriber station 410. If the beam sweeping pattern of the base station 402 is periodical, the subscriber station 410 should be able to predict precisely when the search beam 406 of the base station 402 will pass by. Once the timing of the search beam 406 from the base station 402 is established, the omni-directional beam formed by the subscriber station 410 can be used to receive and store the pilot signal from the base station 402 at the appropriate time. The search beam 416 at the subscriber station 410 can then be effectively swept in the digital domain using the stored pilot signal to determine the angular coordinates which produces the maximum pilot signal strength. These angular coordinates can then be used to form a second tracking beam focused on the base station 402 in the soft handoff region.

Figure 5:
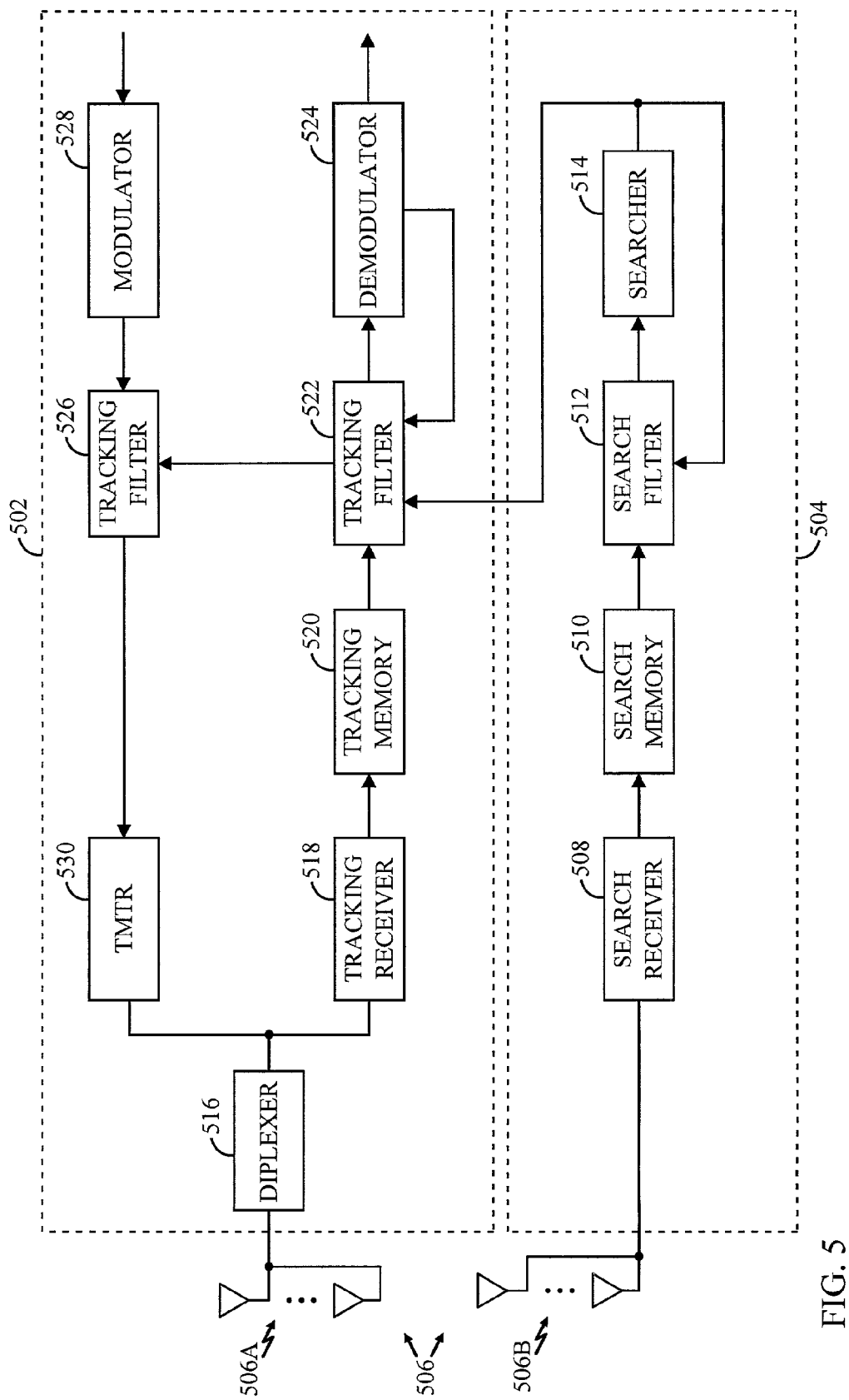
FIG. 5 is a functional block diagram of a CDMA cellular device employing beam steering techniques in accordance with an exemplary embodiment.

FIG. 5 is a functional block diagram of an exemplary a CDMA cellular device employing beam steering techniques. Although the beam steering techniques described and shown in the exemplary CDMA cellular device are performed in the digital domain, those skilled in the art will appreciate that many other methods may be used to steer the tracking and search beam. By way of example, tracking and search beams may be formed using phased array antennas.

The described exemplary beam steering techniques can be employed in any CDMA cellular device such as the base station or the subscriber station. The exemplary CDMA cellular device includes a tracking channel 502 and a search channel 504. The tracking channel 502 includes a transmission path and a receiving path. The search channel 504, on the other hand, is a receive only channel. The receiving path for the tracking channel is shown separately from the search channel for ease of explanation, however, those skilled in the art will appreciate that the functionality can be combined into a single channel and time shared.

The exemplary CDMA cellular device includes an array antenna 506 partitioned into two groups of spatially separated radiating elements. The first group of radiating elements 506a perform the tracking function and the second group of radiating elements 506b perform the search function. The exact number of radiating elements will vary depending on the particular application and design parameters. In the described exemplary CDMA cellular device, the tracking function is performed with four dedicated radiating elements and the search function is performed with a different four dedicated radiating elements. Alternatively, the radiating elements could be time shared between the tracking and search function. In addition, the number of radiating elements can be adaptively changed to facilitate the shaping of the beam pattern. By way of example, using fewer radiating elements results in a wider beam, while using more radiating elements results in a narrower beam.

The search channel includes a search receiver 508 coupled to the search elements 506b. The search receiver 508 amplifies, filters and downconverts the signal from each search element 506b to baseband. An analog-to-digital converter (not shown) in the search receiver 508 digitally samples the baseband signal from each search element and provides the digital baseband samples to a search memory 510.

The search memory 510 provides an omni-directional map of discrete time samples for each search element 506b. The omni-directional time aligned discrete samples from the search memory 510 are coupled to a search filter 512 where an algorithm is invoked for applying a sequence of weights to each set of time aligned samples to effectively shape and steer a search beam in the digital domain. Such algorithms are well known in the art. By way of example, the search memory 510 can be implemented using a first-in-first-out (FIFO) methodology for storing the discrete time samples from each of the search elements 506b. A FIFO method is a storage method that retrieves the signals stored in memory for the longest period of time first. In this manner, the signals, $u_0$, $x_0$, $y_0$, and $z_0$, respectively received from each of the search elements, at $t_0$, are stored in the FIFO. The signals received next from each of the search elements respectively $u_1$, $x_1$, $y_1$, and $z_1$, at $t_1$, are stored in the FIFO behind the signals received at $t_o$. Similarly, the signals received next from each of the search elements respectively $u_2$, $x_2$, $y_2$, and $z_2$, at $t_2$, are stored in the FIFO behind the signals received at $t_1$. The search filter 512 will read out of the FIFO the signals that have been stored in memory the longest period of time first. In this case, $u_0$, $x_0$, $y_0$, and $z_0$ will be read out of the FIFO and coupled to the search filter 512. At this point, the signal is representative of an omni-directional signal at $t_o$. By applying different weights to the signals at to, and combining them, a directional search beam can effectively be formed in the digital domain. Specifically, a directional search beam can be formed in one angular direction by applying the following algorithm:

$$(a_0)(u_0)+(b_0)(x_0)+(c_0)(y_0)+(d_0)(z_0)$$

where $a_0$, $b_0$, $c_0$, and $d_0$ are weights. By varying the weights, the angular direction of the search beam can be changed. Thus, a directional search beam can be formed in a second angular direction by applying the following algorithm:

$$(a_1)(u_0)+(b_1)(x_0)+(c_1)(y_0)+(d_1)(z_0)$$

where $a_1$, $b_1$, $c_1$, and $d_1$ are weights. This procedure can be continued for any number of desired angular directions at $t_o$. Alternatively, complexity reductions in terms of memory can be achieved by forming a search beam at one angular direction at $t_o$, a second angular direction at $t_1$, a third angular direction at $t_2$, and so on. The search memory 510 provides flexibility to employ either beam steering technique, or alternatively, adaptively switch between the two depending upon the demands of the system, the changing propagation environment, or other considerations.

The combined weighted signal from the search filter 512 is coupled to a baseband searcher 514 where the signal strength can be estimated. In systems employing a pilot signal, the baseband searcher can separate the pilot signal from the received signal and compare the pilot signal to a threshold. If the pilot signal strength exceeds the threshold, the weights used by the search filter 512 are coupled to the tracking channel 502 for the purpose of forming a tracking beam. Alternatively, the angular coordinates, or any other signal representative of the weights, could be coupled to the tracking channel 502 to form the tracking beam.

The tracking channel 502 can operate in either a transmit or receive mode. In the transmit mode, the transmission path is coupled to the tracking elements 506a through the diplexer 516. The diplexer 516 provides sufficient isolation to prevent transmitter leakage from desensitizing or damaging the components in the receiving path. In the receive mode, the diplexer 516 directs the signal from the tracking elements 506a to the receiving path. The position of the diplexer 516 can be controlled by an external device (not shown) such as a computer, microprocessor, digital signal processor, or any other device known in the art.

A tracking receiver 518 in the receiving path is coupled to the diplexer 516. Similar to its search receiver 508 counterpart, the tracking receiver 518 amplifies, filters and downconverts the signal from each tracking element 506a to baseband. An analog-to-digital converter (not shown) in the tracking receiver 518 digitally samples the baseband signal for each search element 506a and provides the digital baseband samples to a tracking memory 520. As will be explained below, the tracking memory 520 provides a mechanism for adjusting the tracking beam to maintain a communications channel with a subscriber station.

The digital baseband samples are read out of the tracking memory 520 and coupled to a tracking filter 522. In the described exemplary CDMA cellular device, the weights are fed from the baseband searcher 514 to the tracking filter 522 where they are applied to the digital baseband samples read out of the tracking memory 520. By way of example, if the baseband searcher 514 determined that pilot signal strength was sufficient from the combined weighted signal of:

$$(a_1)(u_0)+(b_1)(x_0)+(c_1)(y_0)+(d_1)(z_0)$$

the constants $a_1$, $b_1$, $c_1$, and $d_1$ could be coupled from the baseband searcher 514 to the tracking filter 522. The tracking filter 522 could then adjust the weights to compensate for the spatial disparity between the tracking elements 506a and the search elements 506b, and then apply the compensated weights to the digital baseband samples read out of the tracking memory 520 as follows:

$$(a_1')(u_0)+(b_1')(x_0)+(c_1')(y_0)+(d_1')(z_0)$$

where $a_1'$, $b_1'$, $c_1'$, and $d_1'$ are the compensated weights, and $u_0$, $x_0$, $y_0$, and $z_0$ are the digital baseband samples from the tracking memory 520 at $t_0$. The combined weighted signal from the tracking filter 522 could then be coupled to a demodulator 72 to despread the desired signal's spectrum.

The weights applied to the digital baseband samples by the tracking filter 522 can be adaptively adjusted to optimize the direction of the tracking beam. This can be achieved by implementing an algorithm in the tracking filter 522 that varies the weights applied to the discrete time samples to effectively track the maximum pilot signal strength. By way of example, the tracking memory 520 can be implemented using a first-in-first-out (FIFO) methodology for storing for discrete time samples from each of the tracking elements 506a. In this manner, the signals, $u_0$, $x_0$, $y_0$, and $z_0$, respectively received from each of the search elements, at $t_0$, are stored in the FIFO. The algorithm invoked by the tracking filter sequences through a series of weights to the signals at $t_0$ that effectively steer the tracking beam to adjacent angular directions. The pilot signal from the neighboring angular directions is separated from the received signal in the demodulator 524 and compared to one another. The weights which result in the the pilot signal with the maximum strength is fed back to the tracking filter 522 for the purpose of adjusting the tracking beam.

The compensated weights from the tracking filter 522 can also be fed to a tracking filter 526 following a modulator 528 in the transmission path. The compensated weights can then be applied to the modulated signal. The tracking filter 526 may further compensate the weights applied to the modulated signal due to any number of factors, including by way of example, different carrier frequencies used for the forward-link and reverse-link. The forward-link refers to transmissions from the base station to the subscriber station, ands the reverse-link refers to transmissions from the subscriber station to the base station. The weighted modulated signal effectively forms a transmission beam that coincides with the tracking beam used by the receiving path.

A transmitter 530 is coupled to the tracking filter 526. The transmitter 530 upconverts, filters and amplifies the weighted modulated signal. The output of the transmitter 530 is coupled through the diplexer 516 to the tracking antennas 506a where the signal is transmitted into free space with increased gain in the direction defined by the weights applied to the signal by the tracking filter 526.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for communicating, comprising:
    means for forming a tracking beam to cover a region, wherein the formation of the tracking beam comprises receiving energy through a plurality of spatially separated elements, applying a weight to the received energy from each of the elements, and combining the weighted energy;
    means for receiving and tracking a signal in the region using at least one tracking beam;
    means for forming a searching beam to received a detected signal, wherein the formation of the searching beam comprises receiving the energy through a second plurality of spatially separated elements, applying a second weight to the received energy from each of the second plurality of elements, wherein the second weight applied to the received energy from each of the second plurality of elements is different; and combining the second weighted energy, the second weight being a function of the weight applied to form the tracking beams;
    means for tracking the signal by adjusting the second weight applied to the received energy from each of the second plurality of elements, wherein the tracking of the signal comprises moving the searching beam to a plurality of locations by adjusting the second weight applied to the received energy from each of the second plurality of elements, and fixing the searching beam in the location having the highest energy level.

2. An apparatus comprising:
    an antenna configured to form multiple searching and tracking beams, wherein the antenna comprises a plurality of spatially separated elements, wherein the elements comprise first and second groups, the first group configured to form the tracking beams and the second group configured to form the searching beams;
    a processor configured to control the antenna to track a signal with the tracking beam and to search for, receive and track a signal with the searching beam, wherein the processor further comprises a filter configured to apply a weight to energy received from the first group of elements, and combining the energy to form the tracking beam, the processor further comprising a searcher configured to search for the first signal as a function of the weighted energy, wherein the processor further comprises a second filter configured to apply a second energy weight to energy received from each of the second group of elements, and combining the weighted second energy to form the second beam, the second weight applied to the energy received from each of the second group of elements being responsive to the searcher.

3. The apparatus of claim 2 wherein the second filter is further configured to apply a different second weight to the received energy from each of the second group of elements.

4. The apparatus of claim 2 wherein the processor further comprises a demodulator configured to demodulate the combined second weighted energy.

5. The apparatus of claim 2 wherein the second filter is further configured to adjust the second weight applied to the received energy from each of the second group of elements as a function of the demodulated combined second weighted energy.

6. A method of communication, comprising:
    forming a multiple beam pattern comprising one or more tracking beams and one or more search beams wherein the formation of the tracking beams comprises receiving energy through a plurality of spatially separated elements, applying a weight to the received energy from each of the elements, and combining the weighted energy; and
    maintaining a communication channel between a first station and a second station using the one or more tracking beams including receiving a first signal from the second station while searching for one or more additional signals using the one or more search beams.

7. The method of claim 6 wherein searching for one or more additional signals comprises:
    searching for multi-path components of the first signal.

8. The method of claim 6 wherein searching for one or more additional signals comprises:
    searching for a second signal from a third station.

9. The method of claim 6 wherein searching for one or more additional signals comprises:
    sweeping the one or more search beams across a region to search for the one or more additional signals.

10. The method of claim 6 wherein forming multiple beam patterns comprises forming omni-directional tracking beams.

11. The method of claim 6 wherein at least one search beam becomes the tracking beam after receiving the first signal from the second station.

12. An apparatus comprising:
    an antenna configured to form multiple beam patterns comprising one or more tracking beams and one or more search beams, wherein the antenna is further configured to form the tracking beams by receiving energy through a plurality of spatially separated elements, applying a weight to the received energy from each of the elements, and combining the weighted energy; and a processor configured to control the antenna to maintain a communication channel between a first station and a second station using the one or more tracking beams including receiving a first signal from the second station while searching for one or more additional signals using the one or more search beams.

13. The apparatus of claim 12 wherein the antenna is further configured to search for multi-path components of the first signal.

14. The apparatus of claim 12 wherein the antenna is further configured to search for a second signal from a third station.

15. The apparatus of claim 12 wherein the antenna is configured to sweep the one or more search beams across a region to search for the one or more additional signals.

16. The apparatus of claim 12 wherein the antenna is further configured to form omni-directional tracking beams.

* * * * *